Sept. 1, 1964    K. J. BATCHELLER ETAL    3,147,086
LINK FOR SERIES OF CONNECTORS
Filed March 8, 1962

INVENTORS
KENT J. BATCHELLER
DANIEL R. McDOUGALL
BY
ATTORNEYS

United States Patent Office 3,147,086
Patented Sept. 1, 1964

3,147,086
LINK FOR SERIES OF CONNECTORS
Kent J. Batcheller, Newton, and Daniel R. McDougall, Norfolk, Mass., assignors to The Thomas & Betts Co., Inc., Elizabeth, N.J., a corporation of New Jersey
Filed Mar. 8, 1962, Ser. No. 178,455
4 Claims. (Cl. 29—180)

This invention relates to a link for connecting the ends of successive strips of electric connectors such as are fed to machines for attaching the individual connectors to wires.

In wiring the electrical systems of many kinds of appliances such as refrigerators, radios, electric ranges, and the like, the assembling operation is greatly speeded up by the use of pre-cut pieces of wire to the ends of which connector members, preferably of the male-and-female type, have been attached. An effective method of attaching an electric connector to an end of a piece of wire is to crimp the wire-gripping elements of the connector around the wire by means of a machine designed and built for that purpose. For rapid operation of such a machine connector members are supplied to it in long series in which the individual members are joined by means of a continous metal ribbon from a side edge of which a short neck extends to each member. The machine to which such a series is fed is provided with means for severing the neck which connects a connector member to the ribbon simultaneously with the operation which crimps the member to a wire. The machine is also usually made to chop off the portion of the ribbon adjacent to the severed neck.

While the length of a series of connectors is usually considerable, five hundred feet being common, the end of the series is eventually reached and a new series has to be started. To avoid the delay incident to the starting of a new series, a link has been developed, according to the invention, to join the leading end of a fresh series to the trailing end of the finishing series in such a manner that the operation of the machine is not interrupted. The link is constructed so that it is disintegrated by the cutting mechanism of the machine after it has served its purpose.

For a more complete understanding of the invention, reference may be had to the following description thereof and to the drawing, of which FIGURE 1 is a perspective view of a link embodying the invention joining the ends of successive series of connectors;

Figure 1:
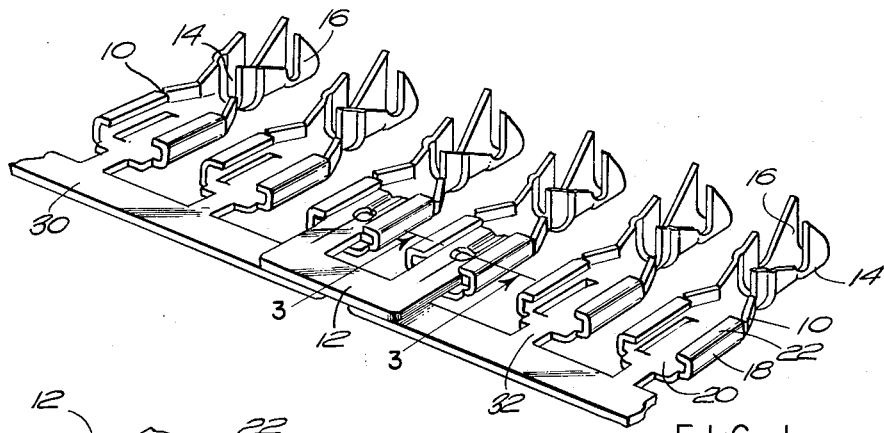
Figure 3:
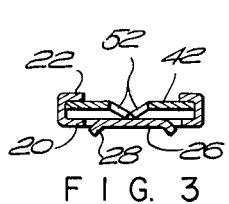
FIGURE 3 is a section on the line 3—3 of FIGURE 1 on a larger scale.

The trailing end portion of a series of connector members 10 and the leading portion of a similar series are illustrated in FIGURE 1, the two series being joined by a link 12 embodying the invention. Each of the connector members 10 is of the female type comprising a wire-gripping portion 14 with upstanding ears 16 ready to be crimped about a wire (not shown) when it is laid in the trough between them, and a connecting portion 18 in the form of a shallow channel with a floor 20 and overhanging flanges 22 arranged to receive a complemental connector of the male type (not shown) of well known form. The connecting portion 18 may be made with various optional details. As shown, the floor 20 has two parallel longitudinal cuts to define a central bridge 26 which can yield downward under pressure when a male connector member (not shown) is thrust into the channel. The bridge 26 is stiffened somewhat by the side margins 28 thereof being struck downward as indicated in FIGURE 3.

Series of connector members such as those illustrated on the drawing are made by a machine which performs a series of stamping operations on a long ribbon of suitable metal, usually brass or bronze, to form a succession of uniformly spaced and arranged connector members which are joined in a connected series rolled up into coils for shipment or storage. In some series the successive connector members are joined end to end, but in the example illustrated on the drawing, the connector members are arranged side by side and are joined by a continuous narrow strip 30, each member having an extension of its floor 20 which is a neck 32 integral with the strip 30 and projecting at right angles thereto. The strip 30 is a marginal portion of the original ribbon from which the series of connector members was made. When a series is fed into a crimping machine, the neck 32 of the connector member is severed simultaneously with crimping operation and the strip 30 is also cut at a nearby point so that the waste material will be reduced to small pieces.

Figure 2:
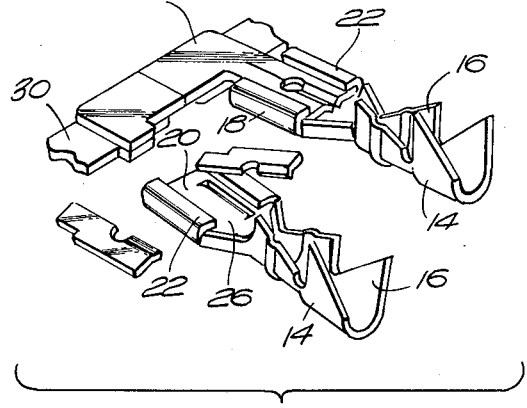
FIGURE 2 is a fragmentary exploded view of a partially disintegrated link joining two series of connectors.
Figure 4:
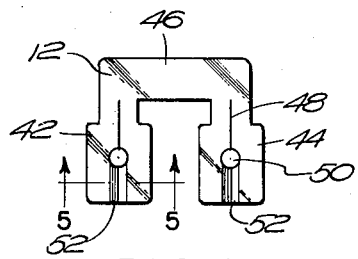
FIGURE 4 is a plan view of a link.
Figure 5:
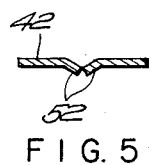
FIGURE 5 is a section on the line 5—5 of FIGURE 4, on a larger scale.

To provide continuity from one series to the next, a link is provided to join them together in such a way that the crimping machine can be operated without interruption. This requires that the spacing between the last connector member of one series and the first member of the next series be the same as that between any two consecutive members of either series. A link 12 embodying the invention comprises essentially a U-shaped piece of sheet metal or equivalent material such as a synthetic resin, the arms 42, 44 of the link being parallel and being shaped to fit into the channel 18 of one of the members 10. The arms 42, 44 are integral with a transverse portion 46 and each arm is longitudinally slit as at 48 to the juncture with the transverse portion. A central hole 50 may be made through each arm to accommodate a central boss on the floor 20 of a connector member 10 if such a boss is there. Between the hole 50 of each arm and the extremity of that arm the narrow margins 52 on each side of the slit 48 are bent down as indicated in FIGURES 3 and 5 so that they project below the plane of the arm. When the arms are thrust into the channels of connector members 10 as indicated in FIGURE 1, the margins 52 along the slits 48 bear strongly on the floors of the connector members and the reaction presses the portions 52 strongly upward. Hence, when the crimping machine severs a neck 32 which is overlaid by an arm 42 or 44, the arm is also severed by a cut across the slit 48, whereupon the upward pressure on the portions 52 causes the halves of the arm released by the cut to spring upward out of the channel of the connector member in which they were engaged, as indicated in FIGURE 2. The arms of the link are thus self-removing from the connector members after they have served their purpose of joining ends of series of connector members for continuity of operation of the crimping machine.

We claim:

1. A link for joining two series of electrical connector members of the female type formed from a single ribbon of metal, each series consisting of connector members of uniform structure arranged side by side with uniform spacing, each said member including a shallow channel the floor of which has an extension at the end thereof connecting it integrally with a continuous band extending longitudinally of the series, said link consisting of a U-shape piece of metal having parallel arms adapted for simultaneous insertion into the channels of two successive connector members of said series, whereby insertion of one of said arms into the channel of the last member of one series and the insertion of the other arm into the channel of the first member of another series will hold said last and first members in mutually related positions equivalent to that of any two consecutive members in said series, each said arm being longitudinally split down its middle from the free end thereof with a portion along its split bent down out of the plane of the arm.

2. A link for joining two series of connector members, said link comprising a single piece of sheet metal in the form of a U having a transverse portion and two parallel arms extending from the transverse portion, each of said arms having a median split extending from its free end to its juncture with said transverse portion, each said arm having a portion thereof along its split bent downward out of the plane of the link.

3. A link for joining two series of connector members, said link comprising a single piece of sheet metal in the form of a U having a transverse portion and two parallel arms extending from the transverse portion, each of said arms having a median split extending from its free end to its juncture with said transverse portion, each said arm having a portion on each side of its split bent down out of the plane of the link.

4. In combination with a series of electrical connector members of the female type formed from a single ribbon of metal a portion of which joins the members and maintains them in uniformly spaced side-by-side array, each said member having a shallow channel portion with a floor, side walls, and flanges on said side walls overhanging the side margins of said floor adapted to receive a complemental male connector member, a flat U-shaped link of sheet metal having parallel arms spaced similarly to consecutive connecting members in said series and shaped to fit in channels of said connector members, one of said arms being engaged between the floor of the channel of a terminal connector of said series and the overhanging flanges thereof.

References Cited in the file of this patent
UNITED STATES PATENTS

| | | |
|---|---|---|
| 494,825 | Spicer | Apr. 4, 1893 |
| 1,125,412 | Towne | Jan. 19, 1915 |
| 1,425,153 | Vigneault | Aug. 8, 1922 |
| 1,860,186 | Kestenman | May 24, 1932 |
| 2,944,330 | Swick | July 12, 1960 |
| 2,946,473 | Moseley | July 26, 1960 |